(12) United States Patent
O'Rourke et al.

(10) Patent No.: US 7,571,235 B2
(45) Date of Patent: Aug. 4, 2009

(54) COMPUTER TELEPHONE INTEGRATION OVER A NETWORK

(75) Inventors: Thomas O'Rourke, Galway (IE); Keith Griffin, Galway (IE); Kevin Gallagher, Galway (IE)

(73) Assignee: Nortel Networks Limited, St. Laurent, Quebec (CA)

( * ) Notice: Subject to any disclaimer, the term of this patent is extended or adjusted under 35 U.S.C. 154(b) by 823 days.

(21) Appl. No.: 10/741,517

(22) Filed: Dec. 19, 2003

(65) Prior Publication Data
US 2005/0138183 A1    Jun. 23, 2005

(51) Int. Cl.
G06F 15/16 (2006.01)
(52) U.S. Cl. ............... 709/228; 379/88.12; 379/265.09; 379/201.12
(58) Field of Classification Search ................. 709/203, 709/318, 217, 227; 715/700; 370/352, 260; 379/265.09, 88.15; 455/456.3; 719/320
See application file for complete search history.

(56) References Cited

U.S. PATENT DOCUMENTS

| | | | |
|---|---|---|---|
| 6,275,230 B1 * | 8/2001 | Ingrassia et al. ............ 715/700 |
| 6,934,756 B2 * | 8/2005 | Maes ........................ 709/227 |
| 7,010,568 B1 * | 3/2006 | Schneider et al. ........... 709/203 |
| 7,433,327 B2 * | 10/2008 | Harville et al. ............. 370/260 |
| 2003/0120748 A1 * | 6/2003 | Begeja et al. ................ 709/217 |
| 2003/0235279 A1 * | 12/2003 | Richomme ............... 379/88.15 |
| 2003/0236924 A1 * | 12/2003 | Auffret et al. ............... 709/318 |
| 2004/0028027 A1 * | 2/2004 | McClung et al. ............ 370/352 |
| 2004/0028212 A1 * | 2/2004 | Lok et al. .............. 379/265.09 |
| 2004/0082345 A1 * | 4/2004 | Lueckhoff ............... 455/456.3 |
| 2004/0117804 A1 * | 6/2004 | Scahill et al. ............... 719/320 |
| 2005/0025127 A1 * | 2/2005 | Strathmeyer ............... 370/352 |
| 2007/0271332 A1 * | 11/2007 | Joshi et al. .................. 709/203 |
| 2008/0086564 A1 * | 4/2008 | Putman et al. ............. 709/227 |

* cited by examiner

*Primary Examiner*—Dustin Nguyen
(74) *Attorney, Agent, or Firm*—Withrow & Terranova, P.L.L.C.

(57) ABSTRACT

A softphone telephony application is provided within a browser using a visible frame to provide event notifications and allow a user to issue commands and a hidden frame which receive asynchronous event notifications as a dynamic HTML stream. Outgoing control commands are implemented as web service behaviours. In this way, all of the functionality required to control a CTI application on a server and to receive event notifications from the CTI application can be provided using standard browser technology and without requiring the installation of any dedicated software or the provision of non-standard communication channels.

23 Claims, 3 Drawing Sheets

COMPUTER TELEPHONE INTEGRATION OVER A NETWORK

TECHNICAL FIELD

This invention relates to computer telephone integration (CTI) over a network. The invention relates in particular to the provision of CTI services between a CTI server and a computer using a web browser.

BACKGROUND ART

Controlling telephony applications from a personal computer is normally accomplished using a dedicated "softphone" piece of software which is installed on a computer. The software enables a user to control either a physical handset which is connected to a private branch exchange (PBX) or a virtual telephony application on the computer from which the user can make or receive calls again via a PBX.

One major requirement of any telephony application such as this is that it can receive unsolicited events. For example, if an incoming call is made to the user's extension, means must be provided for changing the state of the software to notify the user of this unsolicited event. This results in a number of problems. Firstly, it is necessary to install a dedicated piece of software on the user's computer, which results in additional maintenance requirements from the point of view of a network manager if there are upgrades to the software or if a new user needs to be configured on the network.

While the software can be implemented as installed components within a browser (such as ActiveX controls or Java Applets), these components take time to download over the network and require support from the browser. In addition, security clearance must be given in order to operate such components.

Components such as this also require open, dedicated and non-standard communication channels to a CTI server. This can cause problems with firewalls in that additional ports need to be opened which can result in insecure communications and leave a computer open to attacks via the Internet or from other networks.

DISCLOSURE OF THE INVENTION

In a first aspect the invention provides a method of providing an interface over a network between a client computer and a server for controlling telephony equipment. The method includes the steps of:
a) sending to the client computer a first section of code including software elements. When the software elements are loaded a web browser they enable a user to issue commands to the server; and
b) sending to the client computer a second section of code as a stream which includes event notifications which are generated dynamically by the server in response to the telephony equipment. At least some of the event notifications in the second section are adapted to update one or more of the software elements from the first section;

such that the first section provides a browser-based interface suitable for transmitting user generated commands and the second section provides a mechanism for updating the browser with notifications of events provided by the telephony equipment.

This method allows a conventional web browser to access a remote application to control telephony functions, and in particular, to receive unsolicited events from that remote application without having to download additional components or to leave additional communication channels open through the firewall.

Normally, a browser will access a requested address (URL) for a web page, and the web server will respond to the request by sending back the content of the page stored on the web server. As the contents are received the page is displayed, and when the page is complete, the browser awaits the next user action (e.g. clicking on a link, hitting "reload", or typing in a new address).

For the browser to receive updates to the page without any user intervention, one of two methods can be used. The page can include an instruction to the browser to reload the page every so often, or the page can contain active elements such as Java Applets which are small programs executed in the browser and which allow an alternative communications channel to be opened, giving rise to the security problems alluded to above.

The solution of automatically reloading the page is not a valid solution for implementing a telephony control application since the notifications of events need to occur almost instantaneously. For example, if an external call is being made to the user, it is of little use if the page only reloads every ten seconds, as the remote caller may have hung up by the time the user receives the notification and decides to take the call. While the reload frequency can be increased, this increases bandwidth and processing power for each reload, and achieving the degree of responsiveness required for real time event notification would unacceptably increase the bandwidth and processing requirements for the client, the server, and the network.

The invention provides an alternative method of updating a browser window with events such as incoming calls being passed by telephony equipment (such as a private branch exchange to which the user's phone set is connected) to a server which generates code in the "second section" referred to above and sends this to the browser. The second section is an open ended stream, i.e. the browser can keep open a connection in the same way that it continues to download a large web page from a slow server until the page end is reached, which may take many hours (unless a time out has been set). By streaming events in this way, the browser can be entirely conventional and no additional software is needed on the user's machine. Nor is there any need to open additional network connections other than the normal LAN, WAN or Internet connection which will already be secured to the standards required by the user or the organisation in which the user is based.

The "server" referred to above may be a single server connected directly to the telephony equipment and also serving the streams of data across the network. As will be apparent to the skilled person, however, the functions of the server can also be split between two or more servers, such as with one server being in control of the computer telephony integration, i.e. a CTI server, and another server, i.e. a web server, being responsible for streaming the data in response to event messages passed from the CTI server.

The term "stream" as used herein is intended to mean an identifiable collection of data elements. The stream may or may not be continuous but the data in the stream can be identified as being part of a whole, such as all of the data sent to a browser to define a hidden frame in a web page. This data forms a stream in the sense that it provides a simultaneous sequence of events data. Unlike audio or video streaming, however, which is normally as close to being a continuous sequence of data, the streams in this method can include long pauses when there are no events being notified.

Preferably, the first and second sections are provided as first and second frames within a single web page.

In a preferred embodiment, the second frame is encoded for interpretation as a hidden frame. Thus, the header of the frame may set the frame dimensions as zero, and the browser will not reserve any screen space for the display of this frame, or the web page language itself (such as HTML or XML) may have a tag indicating that the frame is invisible.

There is of course nothing to prevent the second frame being visible, and this may contain event notification graphics which are updated as further elements of the stream arrive.

Preferably, as indicated above, the second section is generated as an open-ended stream of code which continues to be generated by the server in response to new events notified by the telephony equipment while the communication with the client computer remains open.

More preferably, the second section is provided as JavaScript in the form of a series of discrete components which encode discrete software elements for interpretation by the browser software. In other words, the web server can generate Javascript code in bursts, with a burst being generated for each event arriving from the telephony equipment, and each such burst of code will be interpreted by the browser in a predetermined fashion, such as by updating the visible display, playing a sound, or generating a screen pop.

Preferably, the discrete software elements referred to are Java or JavaScript elements (Java and JavaScript are trade marks of Sun Microsystems, Inc.).

In a particularly preferred embodiment, the method also includes sending a third section of code, the third section including a web services description of web services available on the server which enable remote control of the telephony equipment. In this way the software elements from the first section operate in conjunction with the web services description from the third section to enable the generation of appropriate commands to access the web services offered by the server, and thereby to control the telephony equipment.

Web services provide a method of application control between computers over a network. A server publishes a description of functions available to remote users (in this case CTI functions) and this description then enables the remote computer to generate commands to the web services application. The advantage is that the description is self sufficient and can be defined according to the needs and capabilities of the service provider, yet the functionality to interpret the description and issue the commands is available to standard browsers.

In one implementation, the first and second sections are transmitted as first and second frames in a web page, and the third section is transmitted each time said web page is requested.

By transmitting the web services description each time the page is requested one can ensure that the client computer is issuing commands which are compatible with the latest version of web services on offer at the server.

The method preferably also involves monitoring the network for commands from the client to operate the web services.

Commands received from the network will preferably also be translated to operating commands for the telephony equipment. Of course they could be passed directly, but this is a less flexible way of maximising the flexibility of services on offer.

In a further preferred embodiment, the method includes the steps of monitoring a first communications session (which includes the first and second sections between the client computer and the server), and of monitoring a second communications session (between the telephony equipment and a remote item of telephony equipment), such that events occurring in the first and second communications sessions are synchronised with one another.

In this way a suitable piece of software will perform session management functions ensuring, for instance, that when a number of users are connected to the PBX from their extensions and to the server from their computers, the correct events and commands are passed within the correct sessions.

Preferably, the first communications session is controlled by a session manager which is in communication with a web server, and the second communications session is controlled by a computer telephone integration (CTI) manager which is in communication with the telephony equipment. The session manager passes commands received from the client computer to the CTI manager, and passing event notifications received from the CTI manager to the web server.

In another aspect the invention provides a method of receiving an interface over a network from a server for controlling telephony equipment, the method including the steps of:

a) receiving over the network a first section of code including software elements which when loaded in web browser software enable a user of the browser software to issue commands to the server; and b) receiving over the network a second section of code in a stream which includes event notifications generated dynamically by the server in response to said telephony equipment, wherein at least some of the event notifications in the second section are adapted to update in the browser software one or more software elements received in the first section;

whereby the first section provides a browser-based interface suitable for transmitting user generated events and the second section provides a mechanism for updating the browser with notifications of events provided by the telephony equipment.

The invention further provides an electrical signal encoding a web page, the web page having at least two frames. One of said frames is a hidden frame generated as a stream of dynamically generated code in response to event notifications from a computer telephone integration application. The other of the frames is a visible frame adapted to be modified within a browser in response to particular events received in the second section and includes web page elements enabling a user to issue commands to said computer telephone integration application.

The electrical signal preferably also includes a section of code describing a command set for controlling web services, the command set being associated with the web page elements in the visible frame, whereby a user activating at least one of the web page elements causes a command to issue from a browser to control a remote web service and thereby control the computer telephone integration application.

It will be appreciated that the electrical signal need not be a continuous signal and in reality is most unlikely to be. Taking the example of a signal over a packet-based network such as the Internet, the signal will be made up of a large number of individual packets passed via a number of routers and other nodes between the server and the client.

In another aspect the invention provides an apparatus for providing an interface over a network between a client computer and a server for controlling telephony equipment. This apparatus includes:

a) a first code generator for generating a first section of code including software elements which when loaded in web browser software enable a user of the client computer to issue commands to the server;

b) a second code generator for generating a second section of code in a stream, the second code generator being in direct or indirect communication with the telephony equipment and being configured to generate event notifications in response thereto, wherein at least some of the event notifications in the second section are adapted to update in the browser software one or more software elements received in the first section;

whereby the first section provides a browser-based interface suitable for transmitting user generated events and the second section provides a mechanism for updating the browser with notifications of events provided by the telephony equipment.

The invention also provides a computer including a memory storing a web page, and a processor executing web browser software which displays the web page, wherein the web page comprises at least two frames, wherein one of the frames is a hidden frame generated as a section of dynamically generated code in response to event notifications from a computer telephone integration application and the other of the frames is a visible frame adapted to be modified within a browser in response to particular events received in the second section and including web page elements enabling a user to issue commands to the computer telephone integration application.

The invention also encompasses a computer network including a client and a server connected across the network, wherein:

the server comprises:
  a) a first code generator for generating a first section of code including software elements which when loaded in web browser software enable a user of the client computer to issue communications commands to the server; and
  b) a second code generator for generating a second section of code in a stream, the second code generator being in direct or indirect communication with the telephony equipment and being configured to generate event notifications in response thereto, wherein at least some of the event notifications in the second section are adapted to update in the browser software one or more software elements received in the first section; and the client comprises:
  a memory storing a web page, and a processor executing web browser software which displays the web page, wherein the web page comprises at least two frames, wherein one of the frames is a hidden frame generated from the second section, and the other of the frames is a visible frame generated from the first section, whereby the first section provides a browser-based interface suitable for transmitting user generated events and the second section provides a mechanism for updating the browser with notifications of events provided by the telephony equipment.

In another aspect there is provided a computer program which, when run on a server having control of telephony equipment, causes the server to:
  a) send over the network to the client computer a first section of code including software elements which when loaded in web browser software enable a user of the client computer to issue communications commands to the server; and
  b) send over the network to the client computer a second section of code in a stream which includes event notifications generated dynamically by the server in response to the telephony equipment, wherein at least some of the event notifications in the second section are adapted to update in the browser software one or more software elements received in the first section;

whereby the first section provides a browser-based interface suitable for transmitting user generated events and the second section provides a mechanism for updating the browser with notifications of events provided by the telephony equipment.

Again, it will be appreciated that the "server" having control of the telephony equipment can be a number of computers with different functions split between them.

A further computer program is provided by the invention which, when run on a computer connected to a network causes the computer to:
  a) receive over the network a first section of code including software elements which when loaded in web browser software enable a user of the browser software to issue commands to the server; and
  b) receive over the network a second section of code in a stream which includes event notifications generated dynamically by the server in response to the telephony equipment, wherein at least some of the event notifications in the second section are adapted to update in the browser software one or more software elements received in the first section;

whereby the first section provides a browser-based interface suitable for transmitting user generated events and the second section provides a mechanism for updating the browser with notifications of events provided by the telephony equipment.

BRIEF DESCRIPTION OF THE DRAWINGS

The invention will now be illustrated by the following description of embodiments thereof given by way of example only with reference to the accompanying drawings, in which.

DETAILED DESCRIPTION OF PREFERRED EMBODIMENTS

Figure 1:
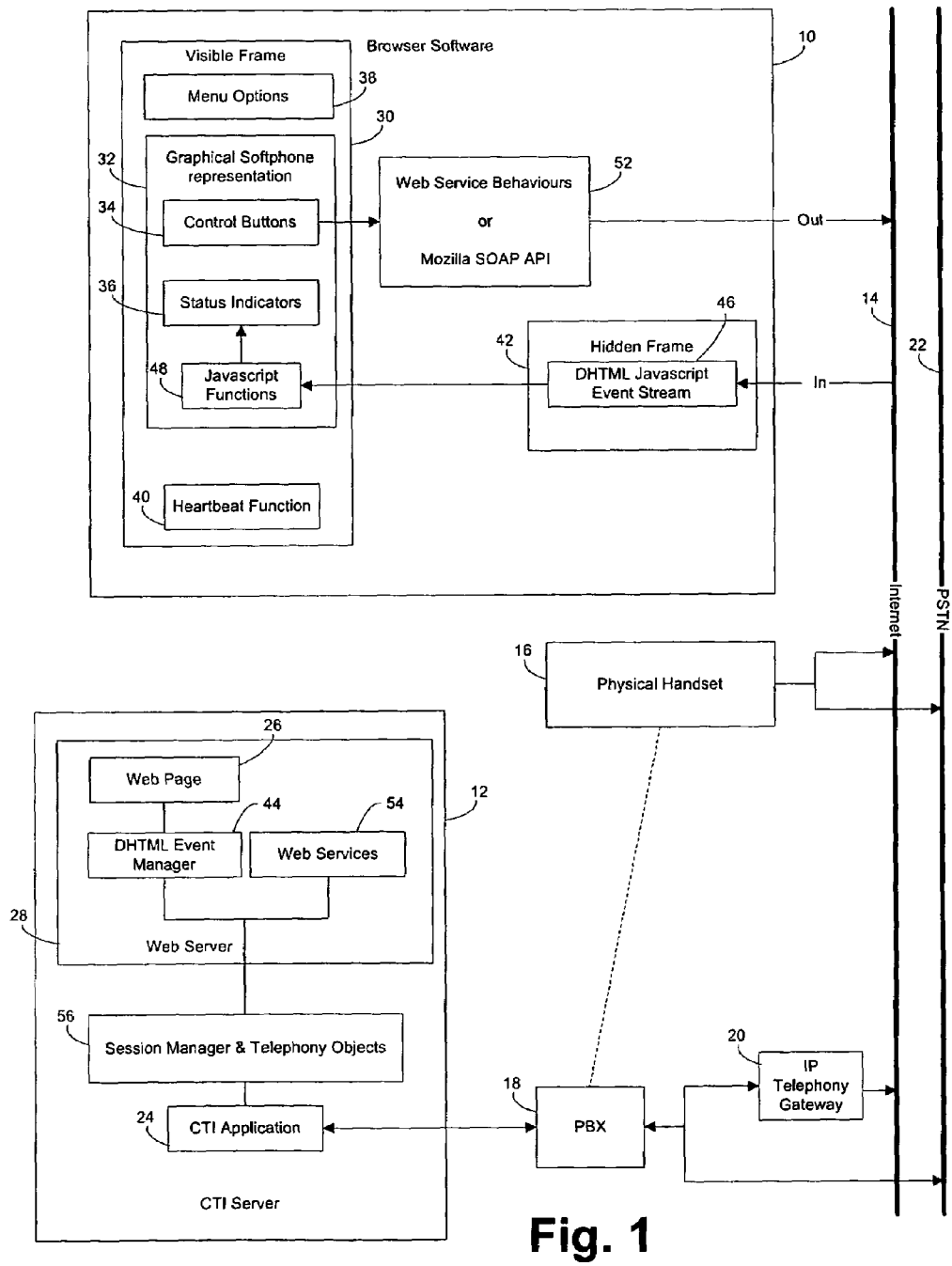
FIG. 1 is an architecture of a system according to the invention.

FIG. 1 is an architecture illustrating a system according to the invention which includes software 10 provided on a user's personal computer or other computing device and a CTI server 12 to which the software can connect via a suitable network such as a local area network (LAN) wide area network (WAN), intranet or (with suitable security measures) the Internet 14. The user also has a physical telephone handset 16 which is connected to a private branch exchange (PBX) 18 either via the Internet 14 and a suitable IP telephony gateway 20 or via the public switched telephone network (PSTN) 22 or some other telephony network such as the network operated by a PBX in an office or other building.

A physical handset can be substituted by a microphone and loudspeaker connected to the computer in which the software 10 operates or some other computer. For the purposes of the embodiment, all that is important is that the user is provided with a telephony application abstracting a physical handset allowing calls to be made and received under the control of the PBX 18.

As is well known in the art, PBX 18 can be controlled by a CTI application 24 which runs on the CTI server 12. The CTI application issues command in a (typically) proprietary format to the PBX to control the operation of the PBX. This allows, for example, a call to be made from the handset 16 to any diallable address or device such as another internal extension or to an external telephone number via the Internet 14 or the PSTN 22. Control of the PBX is effected in the following manner.

Using a standard Internet browser such as Internet Explorer (Internet Explorer is a Trade Mark of Microsoft Corporation) or Netscape (Netscape is a Trade Mark of Netscape Corporation) the user accesses a web page 26 hosted by a web server 28. The web server 28 is shown as being implemented within the CTI server 12, but it can of course operate from a different server if desired.

Web page 26 includes at least two frames. One of these frames is a visible frame 30 which includes a graphical representation of a softphone 32 including items such as control buttons 34 and status indicators 36. The visible frame 30 can also include menu options 38 in known manner. Thus, when a user accesses the web page 26, a visible frame within the browser will provide the user with means for both sending events using the control buttons 34 and receiving events via the status indicators 36 without requiring anything more than standard web page items. The visible frame 30 also includes a heartbeat component 40 which sends periodic "stay alive" heartbeat pulses back to the web server to indicate that the connection is active.

Web page 26 additionally includes a hidden frame 42 which is loaded by the browser when the web page is accessed. Hidden frame 42, however, is not a complete frame but rather is a dynamic HTML stream which is fed to the browser by the web server in a trickle fashion. Thus, the frame begins to load with the normal headers etc., and subsequent HTML code fed to the hidden frame is generated dynamically by a DHTML event manager 44 of the web server. As long as no indication is sent that this frame is complete, it will continue to be loaded by the browser. In this way, it is possible for dynamic events to be formatted as HTML code and sent by the web server to the browser as Javascript code embedded in DHTML. The event stream 46 includes JavaScript commands which are processed by a Java engine 48 implementing Javascript functions within the browser. Such events can be used to update the visible frame, and in this way asynchronous events can be sent to the browser and used to update the visible frame, e.g. notifying the user that an incoming call is present. Event notification such as this can be presented in any suitable way, for example as both visible and audible event notifications. Similarly if the user performs some action on a physical handset, the actions of the user can be updated within the visible frame such that, for example, if the handset is lifted, an indication to this effect can be shown in the browser.

The other major component of the browser software is a set of web service behaviours or a SOAP API 52 which are downloaded when the web page is loaded via a web application 54 maintained on the web server.

Web services provide a platform independent method of publishing from a web server to a browser a set of application control commands. The term "web services" as used herein is a generic term, but embraces the "Web Services" standards of the World Wide Web Consortium (W3C) such as are described at the pages referenced under http://www.w3c.org/2002/ws. In effect, the web service behaviours include a full description of commands and protocols required to control an application running on the server. At the time the page is downloaded, the web service behaviours are fed to the browser and are interpreted by the web service behaviours engine present in compatible browsers such as Internet Explorer and Netscape. In this way, the web page can be used as an interface between the user and the application underlying the web services function on the server.

In the present case, the web service behaviours provide a translation between commands issued using items such as the control buttons 34 and a CTI session manager 56 on the CTI server. The session manager includes telephony software objects which are controlled to issue commands to a CTI application 58 which in turn controls PBX 18. Accordingly, a user wishing to make an outgoing call can either click on the appropriate number buttons on the graphical representation of a softphone or type the number into a window within the visible frame (or access the number from a telephone directory application on the computer) and click on a "make call" button. This action is invoked as a script command which is interpreted by the web service behaviours component which sends the appropriate command to the Web Services which instructs the session manager causing it to instruct the CTI application to dial the number. The CTI application/switch interface (not shown) translates this into the appropriate proprietary signalling to command the PBX to open a connection between the physical handset and the remotely dialled number. The skilled person will appreciate that any other functionality which can be controlled by the CTI application 58 is available to the user via a visible frame of the browser using the underlying web service behaviours to issue commands.

It will be appreciated that this technology enables a softphone application to be implemented entirely within a standard browser without opening any additional communications ports through a firewall and without using any proprietary protocols. Accordingly, the connection can be secured using well-known and trusted technology such as secure sockets layers (SSL) and there is no necessity for any additional software to be maintained on the client computers.

Figure 2:
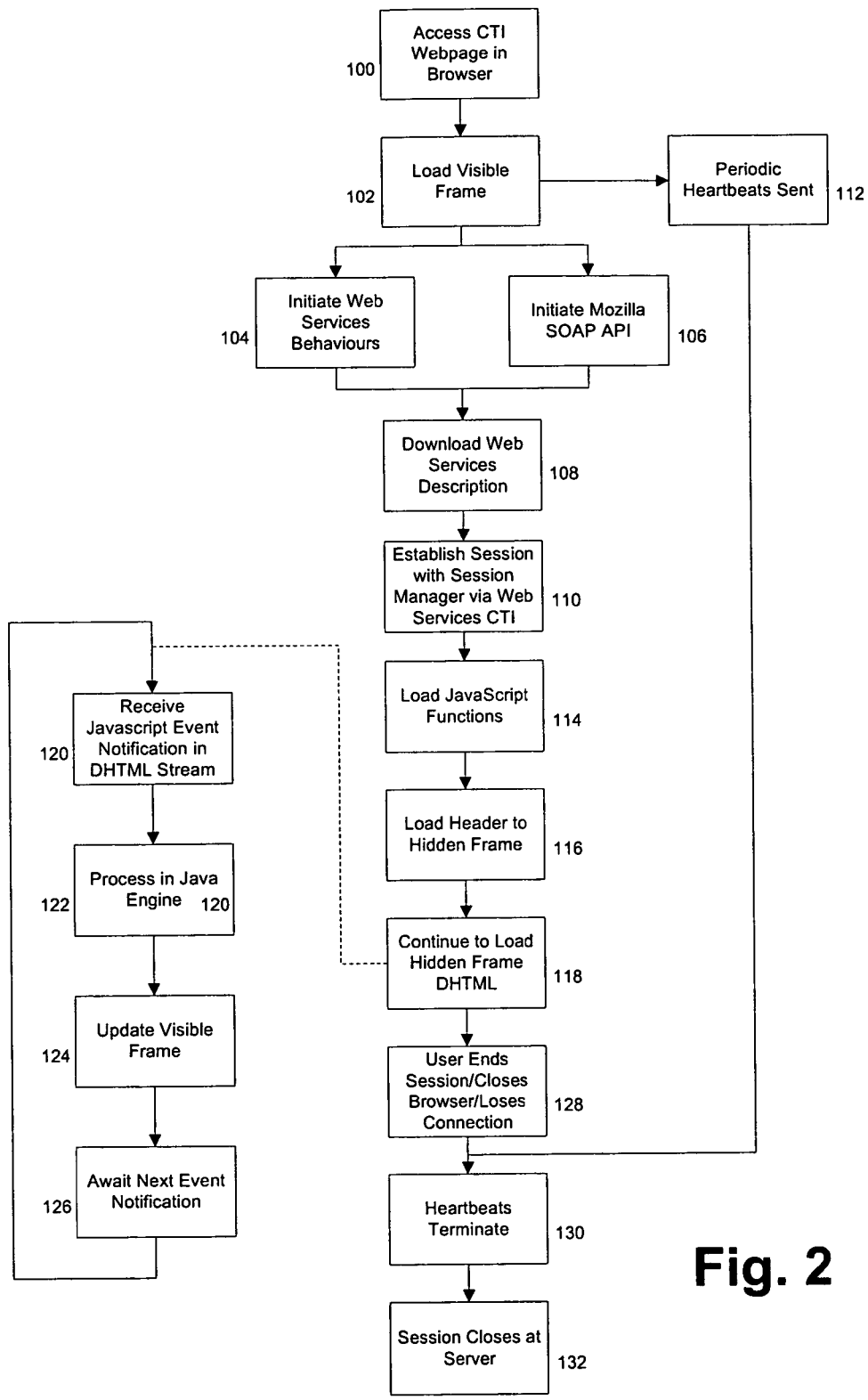
FIG. 2 is a flowchart of the client side process operating in the system of FIG. 1.

Referring to FIG. 2, the operation of the browser is illustrated in flow chart form. The user accesses the CTI web page in the browser, step 100 and this causes the browser to load the visible frame, step 102. An instruction is also sent with the CTI web page to cause the web service behaviours to be initiated. (in a browser such as Internet Explorer), step 104, or to cause a Mozilla SOAP API to be initiated (in a browser such as Netscape), step 106. The first action taken when the web services are initiated is that the Web Services Description Language data is downloaded, step 108, following which a session is established with the session manager via the web services component 54 on the server, step 110.

When the browser has completed loading the visible frame, step periodic heartbeats are sent as described above, step 112. The JavaScript functions are loaded by the browser providing the link between the events arriving into the hidden frame and the visible frame, step 114. The hidden frame header is loaded, step 116 and the browser continues to load the hidden frame as it arrives in dynamic HTML form, step 118. As each JavaScript event notification arrives in the DHTML stream, step 120, it is processed by the Java engine, step 122 and the visible frame updated, step 124. The JavaScript engine then awaits the next event notification which arrives from the browser continues to load the DHTML stream, step 126. In this way, event notifications are continually updated until the user closes the browser or decides to end the session, or the connection is lost, step 128. At this point, the heartbeats terminate, step 130 and the server interprets this as the end of the session, step 132.

Figure 3:
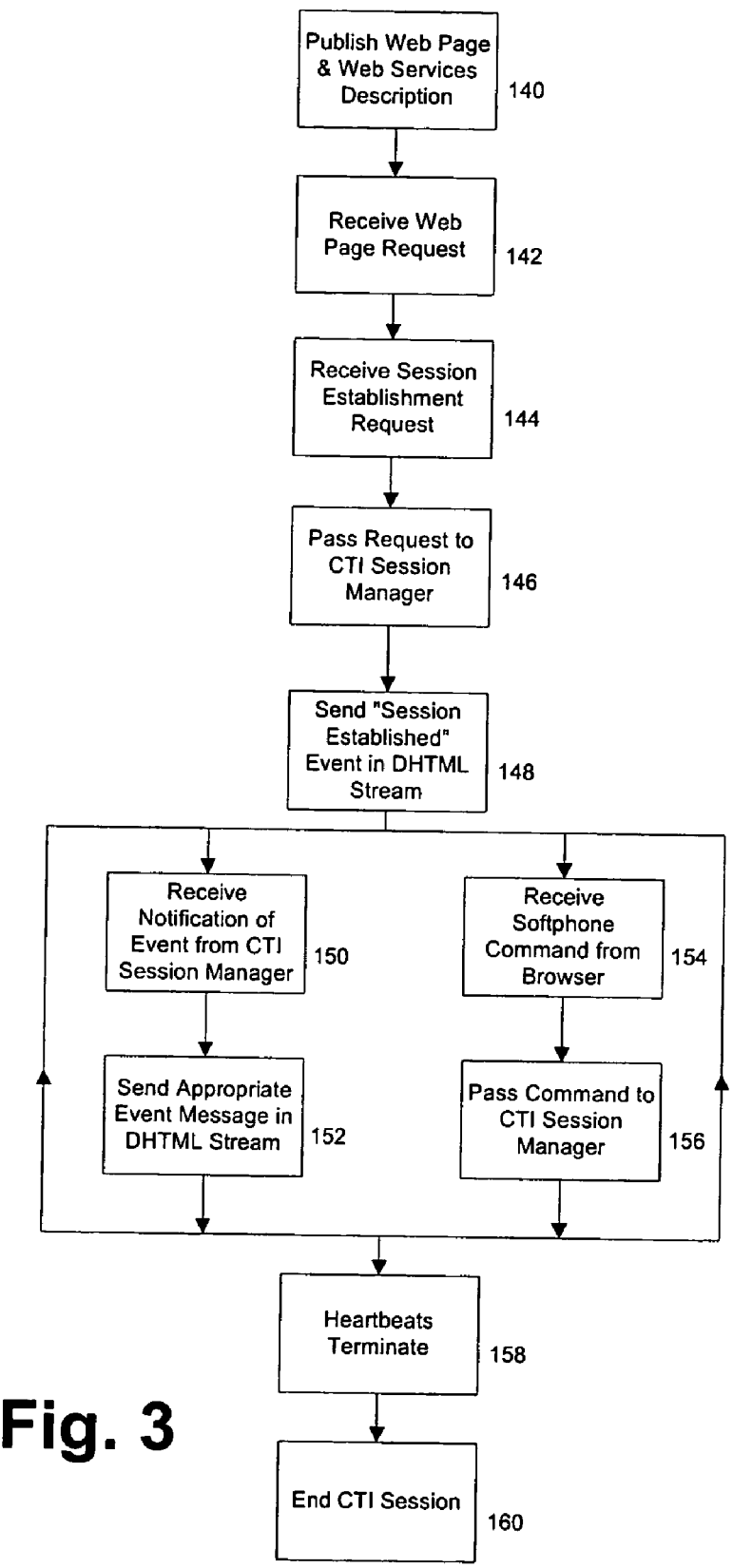
FIG. 3 is a flowchart of the server side process operating in the system of FIG. 1.

The process running on the server is shown in FIG. 3. The web page and web service description is published on the server, step 140 and is available to anyone having the address of the web page and any necessary security clearance. When a web page request is received, step 142, the visible frame, web services description and JavaScript functions are uploaded to the browser from the web server. A session establishment request is then received by the web services component 54, step 144 and this request is passed to the CTI session manager 56, step 146. The session manager returns a message confirming that the session has been established and an appropriate event to this effect is sent in the DHTML stream by the DHTML event manager 44, step 148. During the session, events notified by the CTI session manager, step 150 are formatted appropriately by the DHTML event manager and sent in the DHTML stream, step 152. Commands received from the user's browser, step 154 are received by the web services component 54, step 154 and are passed to the CTI session manager, step 156. These incoming and outgoing events continue throughout the duration of the session until the heartbeats terminate, step 158, at which point the session ends, step 160.

The invention is not limited to the embodiments described herein which may be modified or varied without departing from the spirit and scope of the invention.

The invention claimed is:

1. A method of providing an interface over a network between a client computer and a server for controlling telephony equipment, comprising the steps of:
    a) sending over the network to the client computer a first section of code including software elements which when loaded in web browser software enable a user of the client computer to issue commands to the server; and
    b) formulating a second section of code as an open-ended stream of code which includes event notifications generated dynamically by the server in response to said telephony equipment, wherein at least some of the event notifications in the second section of code are adapted to update in the browser software one or more software elements received in the first section of code;
    c) sending over the network to the client computer said second section of code as a trickled stream of data which is encoded to be progressively and incrementally loaded by said web browser software; and
    d) sending over the network a third section of code, said third section of code including a web services description of web services available on said server which enable remote control of the telephony equipment,
    whereby the first section of code provides a browser-based interface suitable for transmitting user generated events, the second section of code provides a mechanism for updating the browser with notifications of events provided by the telephony equipment, and whereby the software elements from the first section of code operate in conjunction with the web services description from the third section of code to enable the generation of appropriate commands to access the web services offered by the server, and thereby to control the telephony equipment.

2. A method as claimed in claim 1, wherein the first and second sections of code are provided as first and second frames within a single web page.

3. A method as claimed in claim 2, wherein the second frame is encoded for interpretation as a hidden frame.

4. A method as claimed in claim 1, wherein the second section of code is generated as an open-ended stream of code which continues to be generated by the server in response to new events notified by the telephony equipment while the communication with the client computer remains open.

5. A method as claimed in claim 4, wherein the second section of code is provided as dynamic mark-up language code in the form of a series of discrete components which encode discrete software elements for interpretation by the browser software.

6. A method as claimed in claim 5, wherein the discrete software elements are Java or JavaScript elements.

7. A method as claimed in claim 1, wherein the first and second sections of code are transmitted as first and second frames in a web page, and the third section of code is transmitted each time said web page is requested.

8. A method as claimed in claim 1, further comprising monitoring said network for commands from the client to operate the web services.

9. A method as claimed in claim 8, further comprising translating commands received from the client to operating commands for the telephony equipment.

10. A method as claimed in claim 1, further comprising the steps of monitoring a first communications session including said first and second sections of code between the client computer and the server, and of monitoring a second communications session between the telephony equipment and a remote item of telephony equipment, whereby events occurring in the first and second communications sessions are synchronised with one another.

11. A method as claimed in claim 10, wherein the first communications session is controlled by a session manager which is in communication with a web server and the second communications session is controlled by a computer telephone integration manager which is in communication with said telephony equipment, the session manager passing commands received from the client computer to the computer telephone integration manager, and passing event notifications received from the computer telephone integration manager to the web server.

12. A method of receiving an interface over a network from a server for controlling telephony equipment, comprising the steps of:
    a) receiving over the network a first section of code including software elements which when loaded in web browser software enable a user of the browser software to issue commands to the server;
    b) receiving over the network a second section of code as an open-ended stream which includes event notifications generated dynamically by the server in response to said telephony equipment, wherein at least some of the event notifications in the second section of code are adapted to update in the browser software one or more software elements received in the first section of code, wherein said second section of code is received as a trickled stream of data which is encoded to be progressively and incrementally loaded by said web browser software; and
    c) receiving over the network a third section of code, said third section of code including a web services description of web services available on said server which enable remote control of the telephony equipment,
    whereby the first section of code provides a browser-based interface suitable for transmitting user generated events, the second section of code provides a mechanism for updating the browser with notifications of events provided by the telephony equipment, and whereby the software elements from the first section of code operate in conjunction with the web services description from the third section of code to enable the generation of appropriate commands to access the web services offered by the server, and thereby to control the telephony equipment.

13. A method as claimed in claim 12, wherein the first and second sections of code are received as first and second frames within a single web page.

14. A method as claimed in claim 13, wherein the second frame is interpreted within the browser as a hidden frame.

15. A method as claimed in claim 12, wherein the second section of code is received as an open-ended stream of code which continues to be generated by the server in response to new events notified by the telephony equipment while the communication with the browser software remains open.

16. A method as claimed in claim 15, wherein the second section of code is received as dynamic mark-up language code in the form of a series of discrete components which encode discrete software elements for interpretation by the browser software.

17. A method as claimed in claim 16, wherein the discrete software elements are Java or JavaScript elements.

18. A method as claimed in claim 12, further comprising sending to the server commands to operate the web services in response to user actions in the browser.

19. Apparatus for providing an interface over a network between a client computer and a server for controlling telephony equipment, comprising:
  a) memory;
  b) a first code generator for generating a first section of code including software elements which when loaded in web browser software enable a user of the client computer to issue communications control commands to the server;
  c) a second code generator for generating a second section of code as an open-ended stream, said second code generator being in direct or indirect communication with said telephony equipment and being configured to generate event notifications in response thereto, wherein at least some of the event notifications in the second section of code are adapted to update in the browser software one or more software elements received in the first section of code, said second code generator being configured to transmit said second section of code as a trickled stream of data which is encoded to be progressively and incrementally loaded by said web browser software; and
  d) a third code generator for generating a third section of code, said third section of code including a web services description of web services available on said server which enable remote control of the telephony equipment,
  whereby the first section of code provides a browser-based interface suitable for transmitting user generated events, the second section of code provides a mechanism for updating the browser with notifications of events provided by the telephony equipment, and whereby the software elements from the first section of code operate in conjunction with the web services description from the third section of code to enable the generation of appropriate commands to access the web services offered by the server, and thereby to control the telephony equipment.

20. A computer including a memory storing a web page, and a processor executing web browser software which displays said web page, wherein said web page comprises at least two frames, wherein one of said frames is a hidden frame generated as an open-ended stream of dynamically generated code encoded to be progressively and incrementally transmitted to a client as a trickled stream of data in response to event notifications from a computer telephone integration application and the other of said frames is a visible frame adapted to be modified within a browser in response to particular events received in the open-ended stream of dynamically generated code and including web page elements enabling a user to issue commands to said computer telephone integration application, whereby the open-ended stream of dynamically generated code includes a section of code which includes a web services description of web services available to said user which enables remote control of the computer telephone integration application, whereby the open-ended stream of dynamically generated code operates to enable the generation of appropriate commands to access the web services available to said user, and thereby to control the computer telephone integration application.

21. A computer network including a client and a server connected across the network, wherein:
  the server comprises:
    a) a first code generator for generating a first section of code including software elements which when loaded in web browser software enable a user of the client computer to issue communications commands to the server;
    b) a second code generator for generating a second section of code as an open-ended stream, said second code generator being in direct or indirect communication with said telephony equipment and being configured to generate event notifications in response thereto, wherein at least some of the event notifications in the second section of code are adapted to update in the browser software one or more software elements received in the first section of code, said second code generator being configured to transmit said second section of code as a trickled stream of data which is encoded to be progressively and incrementally loaded by said web browser software; and
    c) a third code generator for generating a third section of code, said third section of code including a web services description of web services available on said server which enable remote control of the telephony equipment,
  the client comprises:
    a memory storing a web page, and a processor executing web browser software which displays said web page, wherein said web page comprises at least two frames, wherein one of said frames is a hidden frame generated from said second section of code, and the other of said frames is a visible frame generated from said first section of code,
  whereby the first section of code provides a browser-based interface suitable for transmitting user generated events, the second section of code provides a mechanism for updating the browser with notifications of events provided by the telephony equipment, and whereby the software elements from the first section of code operate in conjunction with the web services description from the third section of code to enable the generation of appropriate commands to access the web services offered by the server, and thereby to control the telephony equipment.

22. A computer program product comprising a computer storage medium encoded with instructions which, when executed on a server having control of telephony equipment, are effective to cause the server to:
  a) send over the network to the client computer a first section of code including software elements which when loaded in web browser software enable a user of the client computer to issue commands to the server;
  b) formulate a second section of code as an open-ended stream which includes event notifications generated dynamically by the server in response to said telephony equipment, wherein at least some of the event notifications in the second section of code are adapted to update in the browser software one or more software elements received in the first section of code;

c) send over the network to the client computer said second section of code as a trickled stream of data which is encoded to be progressively and incrementally loaded by said web browser software; and d) send over the network to the client computer a third code generator which includes a web services description of web services available on said server which enable remote control of the telephony equipment, whereby the first section of code provides a browser-based interface suitable for transmitting user generated events, the second section of code provides a mechanism for updating the browser with notifications of events provided by the telephony equipment, and whereby the software elements from the first section of code operate in conjunction with the web services description from the third section of code to enable the generation of appropriate commands to access the web services offered by the server, and thereby to control the telephony equipment.

23. A computer program product comprising a computer storage medium encoded with instructions which, when executed on a computer connected to a network are effective to cause the computer to:

a) receive over the network a first section of code including software elements which when loaded in web browser software enable a user of the browser software to issue commands to the server;

b) receive over the network a second section of code as an open-ended stream which includes event notifications generated dynamically by the server in response to said telephony equipment, wherein at least some of the event notifications in the second section of code are adapted to update in the browser software one or more software elements received in the first section of code, wherein said second section of code is received as a trickled stream of data which is encoded to be progressively and incrementally loaded by said web browser software; and c) send over the network a third code generator which includes a web services description of web services available on said server which enable remote control of the telephony equipment, whereby the first section of code provides a browser-based interface suitable for transmitting user generated events, the second section of code provides a mechanism for updating the browser with notifications of events provided by the telephony equipment, and whereby the software elements from the first section of code operate in conjunction with the web services description from the third section of code to enable the generation of appropriate commands to access the web services offered by the server, and thereby to control the telephony equipment.

* * * * *